United States Patent [19]

United States Patent [19]

Ohara et al.

[11] Patent Number: 5,008,605
[45] Date of Patent: Apr. 16, 1991

[54] ELECTRIC DRIVING DEVICE CAPABLE OF ELIMINATING BACKLASH

[75] Inventors: Tsunemasa Ohara, Tokyo; Tomoo Shibanai, Utsunomiya, both of Japan

[73] Assignee: Canon Kabushiki Kaisha, Tokyo, Japan

[21] Appl. No.: 141,730

[22] Filed: Jan. 11, 1988

[30] Foreign Application Priority Data

Jan. 12, 1987 [JP] Japan ................................. 62-4594

[51] Int. Cl.$^5$ ............................................. G05B 11/01
[52] U.S. Cl. ...................................... 318/630; 354/400
[58] Field of Search ............... 318/630, 631, 436, 430, 318/431, 443, 470; 354/400; 74/409, 440; 409/5; 367/135

[56] References Cited

U.S. PATENT DOCUMENTS

| 1,549,438 | 8/1925 | Blood | 318/436 |
| 3,766,461 | 10/1973 | Leenhouts | 318/630 |
| 3,886,424 | 5/1975 | Hoshina et al. | 318/630 |
| 3,971,293 | 7/1976 | Hunkeler | 74/409 |
| 4,042,869 | 8/1977 | Eickelberg et al. | 318/630 |
| 4,507,595 | 3/1985 | Rozsa | 318/630 |
| 4,537,487 | 8/1985 | Taniguchi et al. | 354/400 |

Primary Examiner—David Smith, Jr.
Attorney, Agent, or Firm—Fitzpatrick, Cella, Harper & Scinto

[57] ABSTRACT

A mechanism such as a camera has an electric driving device being capable of eliminating backlash, is equipped with an electric driving unit, an actuation unit driven by the driving force of the electric driving unit, a gear train for transmitting the driving force of the electric driving unit to the actuating unit, and a control unit for power supply to the electric driving unit for eliminating the backlash generated in the gear train.

16 Claims, 4 Drawing Sheets

ELECTRIC DRIVING DEVICE CAPABLE OF ELIMINATING BACKLASH

BACKGROUND OF THE INVENTION

1. Field of the Invention

The present invention relates to an electric driving unit capable of eliminating backlash generated in a gear train, and more particularly to an electric driving device adapted for precisely conducting automatic focusing or feeding operation in a camera, without the influence of backlash.

2. Related Background Art

In the field for example of automatic focusing devices for automatically focusing a photographing lens, there is already known a structure of rotating a helicoid ring with a small motor through a gear train. In such devices, since precision on the order of several microns is required in the lens position control, a mechanism for detecting the lens movement has to have a resolving power of several microns, measured in the amount of lens movement. Such a detecting mechanism is generally provided at the first gear of the gear train, and certain backlash is inevitable in the meshing of gears. Consequently, in a lens driving operation, even if the detected amount of lens movement is correct, the actual amount of lens movement may be decreased due to free plays of gears resulting from the backlash thereof. Also if the amount of lens movement& is as small as the magnitude of said play, the lens may not be moved at all even though the motor is driven.

SUMMARY OF THE INVENTION

In consideration of the foregoing, a first object of the present invention is to provide an electric driving device capable of eliminating backlash, provided with electric driving means; an actuator device to be actuated by the driving force of said electric driving means; a gear train for transmitting the driving force of said electric driving means to said actuator device; and control means for current supply to said electric driving means for eliminating the backlash generated in said gear train, thereby achieving a precise operation without the influence of backlash.

A second object of the present invention is, in the above-mentioned electric driving device, to cause said control means to classify said current supply at least into a current supply for starting and a weaker current supply than said starting current supply, for immobilizing said actuator device at the elimination of backlash, thereby ensuring the start of backlash emliminating operation and preventing the erroneous operation of the actuator device by the backlash eliminating operation.

A third object of the present invention is, in the above-mentioned electric driving device, is to further provide discrimination means for identifying whether a backlash eliminating operation has been actually conducted, thereby improving the reliability of the backlash eliminating operation.

A fourth object of the present invention is, in the above-mentioned electric driving device, to provide a limit time in said backlash eliminating operation, thereby enabling the function of the actuator device even when the backlash eliminating operation is not completed.

The foregoing and still other objects of the present invention, and the advantages thereof, will become fully apparent from the following description of the embodiments.

DETAILED DESCRIPTION OF THE PREFERRED EMBODIMENTS

Figure 1:
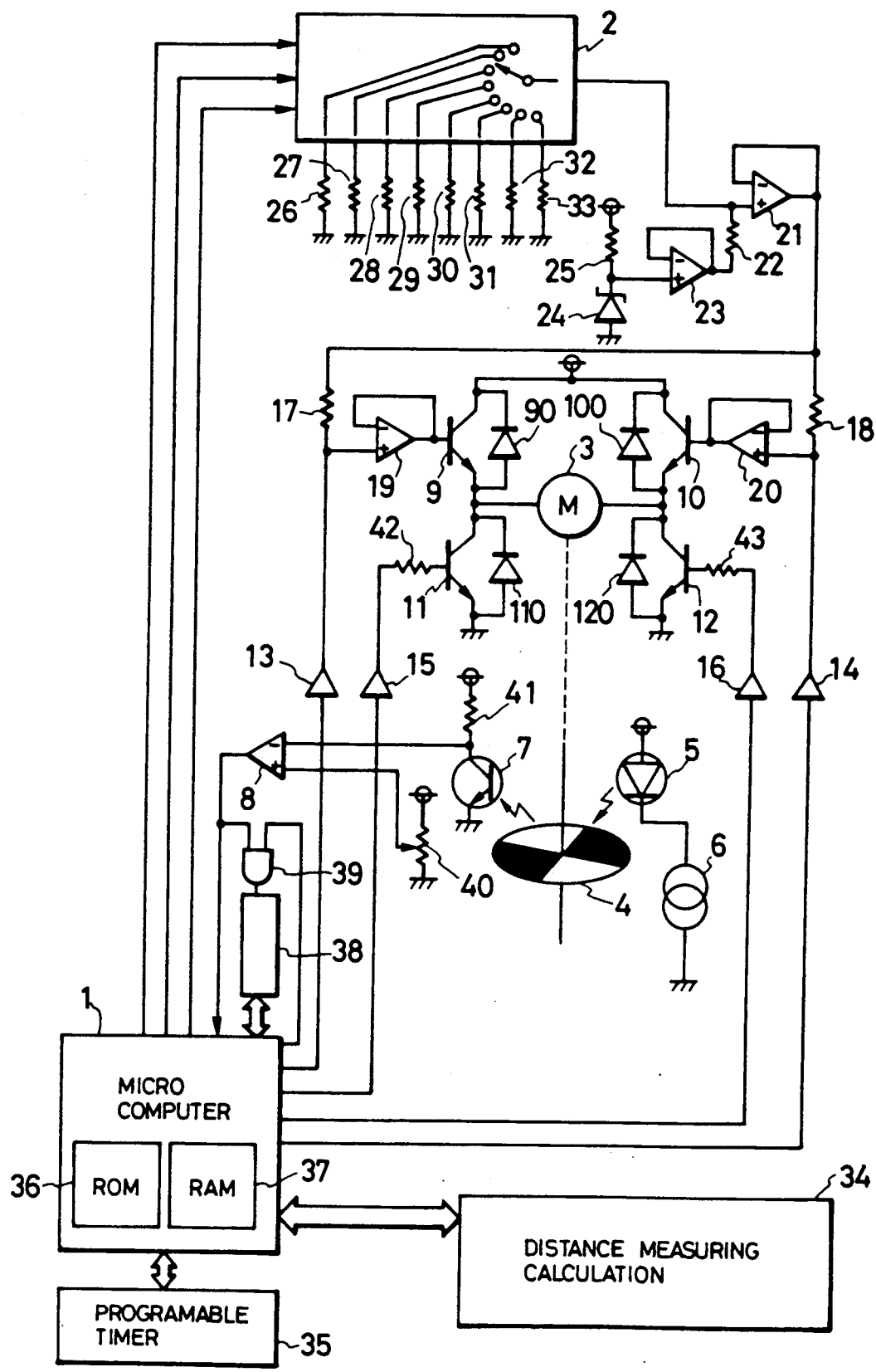
FIG. 1 is a circuit diagram of an embodiment of the device of the present invention.
Figure 2:
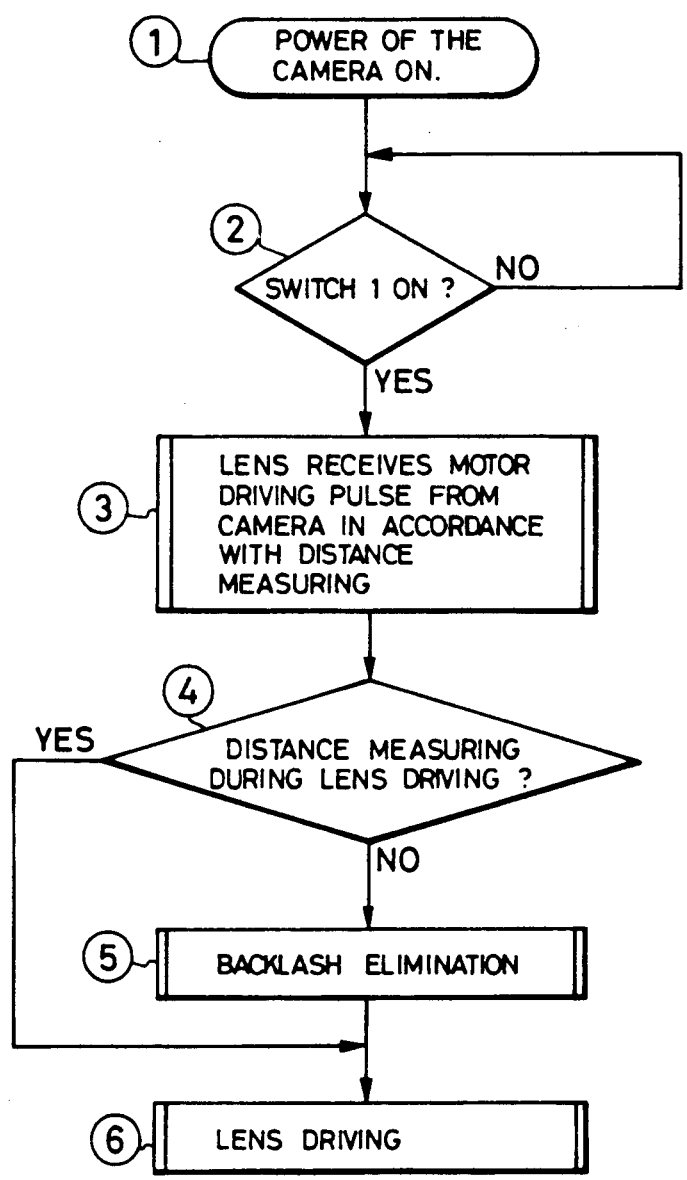
FIG. 2 is a flow chart showing the function of the device FIG. 1.
Figure 3:
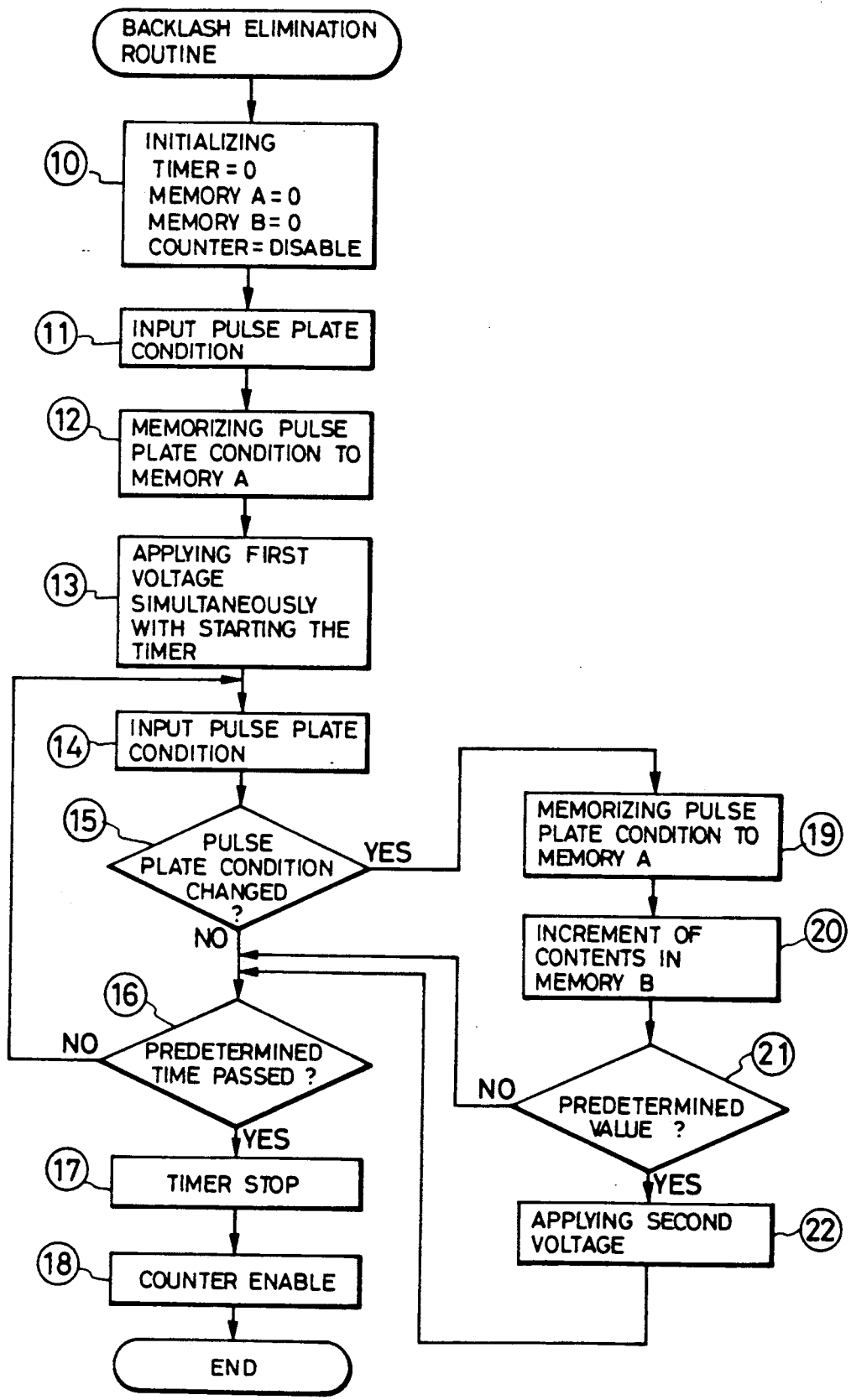
FIG. 3 is a flow chart showing the details of a backlash eliminating routine in FIG. 2.
Figure 4:
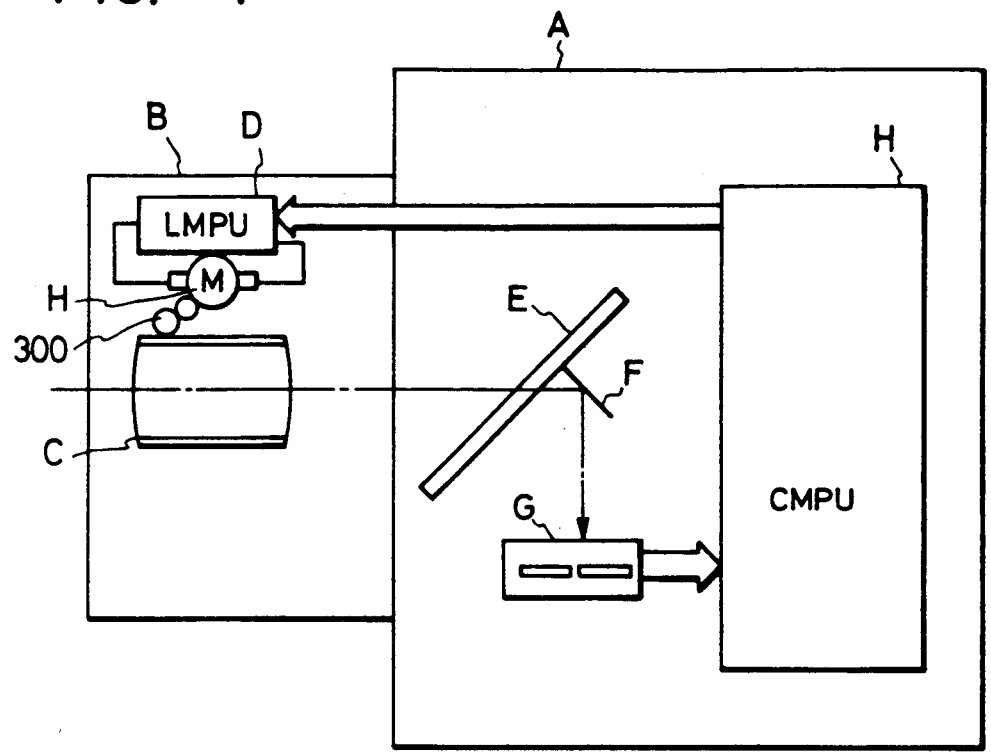
FIG. 4 is a schematic lateral view of a camera and a lens in which the device of FIG. 1 is applied.
Figure 5:
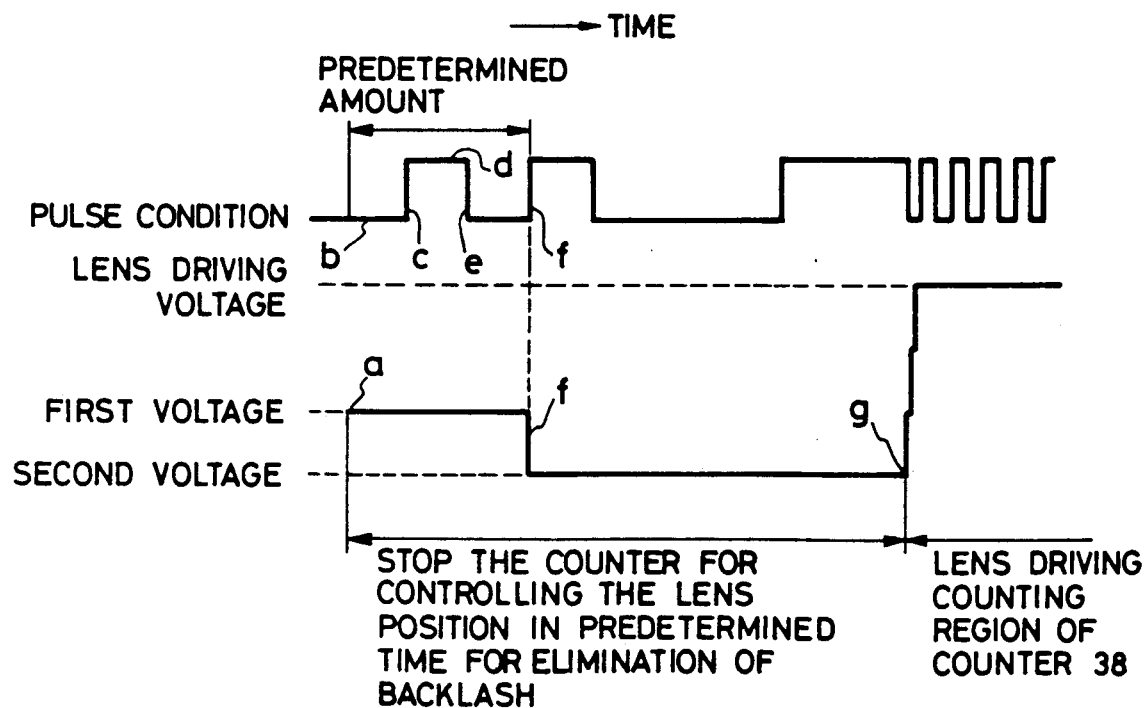
FIG. 5 is a timing chart showing the relationship between the state of a pulse plate shown in FIG. 1 and the voltage given to the motor.

Now the present invention will be clarified in detail by embodiments thereof shown in the attached drawings. FIG. 1 is a circuit diagram of an embodiment of the device of the present invention; FIG. 2 is a flow chart of the function of the device in FIG. 1; FIG. 3 is a flow chart showing the details of a backlash eliminating routine in FIG. 2; FIG. 4 is a schematic lateral view of a camera and a lens in which the device of FIG. 1 is applied; and FIG. 5 is a timing chart showing the relationship between the state of a pulse plate shown in FIG. 1 and the voltage given to the motor.

In FIG. 1 there are shown a microcomputer 1; a multiplexer 2; a motor 3 for driving an unrepresented focusing ring of the lens; a pulse plate 4 rotated in linkage with said motor and having a pattern defining areas of different light reflectance such as black and white; a light emitting diode (LED) 5; a current source 6 for driving said LED with a constant current; a phototransistor 7 for receiving the light of said LED 5 reflected by the pulse plate 4 and converting the intensity of said light into an electrical signal; a comparator 8 for detecting the amount of rotation of the motor 3 in cooperation with said pulse plate 4, LED 5, current source 6 and phototransistor 7; and providing a corresponding signal to the microcomputer 1; transistor 9-12 constituting a bridge circuit for driving said motor 3 and respectively connected to blocking diodes 90, 100, 110, 120; buffer gate 13-16 of open-collector output; resistors 17, 18, 22; and buffer amplifiers 19-21, 23.

Said transistors 9-12 are on-off controlled by the microcomputer 1 through the buffer gates 13-16. The transistors 9, 10 are on-off controlled by the buffer gates 13, 14 of open-collector output, and the voltage supplied to the motor 3 at the turned-on state (when the buffer gates 13, 14 are open) depends on the output of the buffer amplifier 21. When said buffer gates 13, 14 are open, the output voltage of said buffer amplifier 21 is supplied to the buffer amplifier 19, 20 through the resistors 17, 18, and the transistors 9, 10 supply the motor 3 with a voltage according to the output voltages of the buffer amplifiers 19, 20. The multiplexer 2, having 8 input terminals respectively grounded through resistors 26-33 and 1 output terminal, connects one of said input terminals with the output terminal, in response to a 3-bit control signal supplied from the microcomputer 1.

A Zener diode 24 is powered through a resistor 25 and supplies the buffer amplifier 23 with a constant voltage. Said buffer amplifier 23 provides a voltage same as that determined by the Zener diode 24. The buffer amplifier 21 receives a voltage determined by dividing the constant voltage from the buffer amplifier 23 by means of the resistor 22 and one of the resistors 26–33 selected by the multiplexer 2, and releases a same voltage. For the purpose of controlling the unrepresented focusing ring of the lens, for moving the focusing lens, the microcomputer 1 receives an instruction from a distance calculation device 34, and inspecting the amount of drive of the motor and the driving speed thereof through the pulses given from the comparator 8, controls the rotating direction, on-off state and braking of the motor 3 by controlling the transistors 9–12 through the buffer gates 13–16 and by selecting one of the resistors 26–33 of the multiplexer 2 through the 3-bit control signal. There is provided a programmable timer 35 capable of starting, stopping and resetting time measurement and sending the result of time measurement to the microcomputer 1. In the microcomputer 1 there are incorporated a ROM storing a control program and various constants, and a RAM capable of storing various constants. There are provided also a counter 38 and an AND gate 39. For the purpose of lens position control, The counter 38 counts the output signal of the comparator 8 through the AND gate 39 controlling the start and end of counting operation, and supplies the microcomputer 1 with the obtained count as the amount of rotation of the motor 3. Also the up/down counting operation and the resetting of the counter 38 can be controlled by the microcomputer 1. A positive input terminal of said comparator 8 is connected to a power supply through a variable resistor, and a negative input terminal thereof is connected to said power supply through a resistor 41. Also resistors 42, 43 are connected, respectively, to the transistors 11, 12.

Now reference is made to FIGS. 2 and 3 for explaining the function of the above-described embodiment.

In FIG. 2, the power supply is turned on by an unrepresented main switch of the camera in a step 1. Then a step 2 detects whether a switch 1 (usually actuated by a first stroke of the shutter release button) is closed, and the sequence proceeds to a step 3 if said switch is closed, or returns to the step 2 if it is open. In the step 3, the distance calculation device 34 in the camera measures the distance and sends the result of said measurement as the motor driving pulses to the lens. Then a step 4 discriminates whether said distance measurement has been made during a lens drive, and, if yes, the sequence proceeds to a step 6. On the other hand, if said distance measurement has not been made during a lens drive, a step 5 eliminates the backlash of the gear train, and the sequence then proceeds to the step 6 for conducting lens drive. As will be apparent from this flow chart, if the distance measurement is conducted during a lens driving operation, there exists no backlash in the gear train. It is therefore not necessary to eliminate the backlash, and to shorten the time from the distance measurement to the lens driving operation. FIG. 3 shows the details of the backlash eliminating routine in the step 5 in FIG. 2. In FIG. 3, a step 10 for initialization resets the programmable timer 35, but the time measurement is not initiated. It also clears a memory A of the RAM 37, storing whether the pattern of the pulse plate 4 indicating the amount of rotation of the motor is white or black, and a memory B storing the number of changes from white to black of said pattern of the pulse plate 4. Furthermore it shifts an input to the AND gate 39 to the low-level state to prohibit the counting operqtion of the counter 38. In this manner the pulses generated during the backlash eliminating operation are not counted.

Then a step 11 reads, through the comparator 8, whether the pattern of the pulse plate 4 is white or black, and a step 12 stores the state of the pulse plate 4, read in the step 11, in the aforementioned memory A. A step 13 causes the multiplexer 2 to select a first voltage which is capable of activating the gear train but is weaker than the voltage in the lens drive in the step 6 and applies said voltage to the motor 3 by controlling the buffer gates 13–16, and simultaneously activates the programmable timer 35 by the microcomputer 1. Then a step 14 reads the state of the pulse plate 4 in the same manner as in the step 11. A step 15 compares the state of the pulse plate 4 read in the step 14 with that stored in the memory A in the step 12, and the sequence proceeds to a step 19 in case there has been a change, or to a step 16 in case of no change. The step 16 continues the application of said first voltage until the programmable timer 35 activated in the step 13 reaches a predetermined time stored in the ROM 36, and a step 17 terminates the counting operation of the programmable timer 35 by the microcomputer 1. Then a step 18 opens the AND gate 39 to initiate the counting operation of the counter 38. The step 19 stores the state of the pulse plate 4, read in the step 14, anew in the memory A. A step 20 then executes an increment of the number of changes of the state of the pulse plate 4, stored in the aforementioned memory B. A step 21 discriminates whether the number increased in the step 20 has reached a predetermined number stored in the ROM 36. The application of the first voltage is continued until said predetermined number is reached. A step 22 causes the multiplexer 2 to switch said first voltage, supplied to the motor 3, to a second voltage, which is lower than said first voltage and is selected at such level capable of driving the gear train but incapable of driving the aforementioned helicoid ring. The backlash eliminating routine is terminated after the lapse of a predetermined time.

In the following there will be explained an embodiment in which the device of FIG. 1 is applied to a conventional camera. In FIG. 4 there are shown a camera body A; an interchangeable lens B detachably mounted on said camera body A; a motor H with peripheral devices provided in the interchangeable lens B and corresponding to the motor 3 in FIG. 1; a lens C axially movably provided in the lens B by means of said motor 3 through a gear train 300; and a microprocessor D in the lens, corresponding to the microcomputer 1, programmable timer 35 etc. in FIG. 1. In the camera body A there are further provided a main mirror E, a sub-mirror F, a distance measuring sensor G and a camera microprocessor H. In the following there will be explained the function of the above-explained structure. At first the camera microprocessor H calculates the correlation of two images on the distance measuring sensor G, constituting for example an automatic focusing device of second-order imaging method as disclosed in the Japanese Patent Laid-open No. 107313/1984, and determines the amount of defocus. Then said defocus amount is transmitted, through unrepresented contacts, to the lens microprocessor D, which, in response, calculates the amount of movement of the lens C, and, after eliminating the backlash of the gear train as explained before, drives the motor 3 by an amount corresponding to said amount of movement, thereby bringing the lens C to the focused position.

Now reference is made to FIG. 5 for explaining the relationship between the state of the pulse plate 4 shown in FIG. 1 and the voltage to be supplied to the motor 3.

When a drive command of the motor 3 is transmitted from the distance calculation device 34 to the microcomputer 1, the programmable timer 35, RAM 37, counter 38 and AND gate 39 are suitably initialized, and the state of the pulse plate 4 indicating the amount of rotation of the motor is read through the comparator 8 and stored in the memory A of the RAM 37. Then the multiplexer 2 selects a first voltage lower than the normal lens driving voltage, and said voltage is supplied to the motor 3 by the control of the buffer gates 13–16 in a desired rotating direction of the motor. At the same time the programmable timer 35 is activated. These operations are conducted at a point a in FIG. 5. The control sequence repeats the loop of steps 14–16 in FIG. 3 while the initially read state of the pulse plate remains unchanged, while the elimination of backlash of the gear train (300 in FIG. 4) is not completed and while a predetermined time is not exceeded, as indicated by a point b in FIG. 5. When the state of pulse plate is changed as indicated by a point c in FIG. 5, the new state is stored in the memory A anew, and the number of changes is stored in the memory B. However, as the number of changes of the state of pulse does not reach a predetermined value, the sequence returns to the above-mentioned loop of steps 14–16. In a point d, the sequence still repeats the loop of the steps 14–16, as the state of the pulse plate newly stored in the memory A remains unchanged. Then, at a point e, there are stored the state of the pulse plate and the number of changes as at the point c. These procedures are repeated until a point f, where the number of changes reaches a predetermined value, indicating a certain progress of the backlash eliminating operation. At this point the multiplexer 2 switches said first voltage, supplied to the motor 3, to an even lower second voltage in order to ensure that the photographing lens does not move when the backlash is completely eliminated by the movement of the gear train. Said second voltage continues to be supplied to the motor 3 until the programmable timer 35, activated at the point a, reaches a predetermined time. Upon expiration of said predetermined time at a point g, the programmable timer 35 is stopped, and the AND gate 39 is opened to initiate the operation of the counter 38. The backlash eliminating operation is thus terminated. Subsequently the lens is driven as explained before. In the foregoing embodiment the backlash eliminating operation is terminated even in a situation where the number of changes of the state of pulse plate does not reach a predetermined value so that the elimination of backlash does not proceed, and the above-mentioned first voltage is not switched to the second voltage, because otherwise the focusing operation and the exposure operation cannot be started if the gear train is harder to drive under a low temperature or a high humidity, and the user may lose the opportunity release the shutter. It is also possible, if the backlash elimination does not proceed properly, to supply a third voltage higher than said first voltage within said predetermined time, and to shift to the second voltage after the rotation of the pulse plate by a predetermined amount.

In the foregoing embodiments the backlash elimination has been applied to an automatic focusing device, but such backlash elimination is applicable to any operation potentially involving backlash, such as film advancing.

In the present invention, even if said second voltage, incapable of rotating the helicoid ring, is lower than the minimum starting voltage of the motor, the motor can continue rotation as it has been securely started by said first voltage. There usually exists a hysteresis between the minimum starting voltage and the minimum operating voltage, so that the latter voltage after the motor is started is lower than the former, and the elimination of the backlash of the gear train can be realized at a practical voltage level.

What is claimed is:

1. An electric driving device capable of eliminating backlash, comprising:
   (a) electric drive means for generating a driving force;
   (b) actuator means to be activated by the driving force of said electric drive means;
   (c) gear means for transmitting the driving force of said electric drive means to said actuator means; and
   (d) control means for supplying electric power to said electric drive means to eliminate backlash generated in said gear means, the electric power being supplied at a first power level during an initial period when said electric drive means is started and being supplied at a second power level lower than said first power level subsequent to said initial period, wherein both the first level and the second level are lower than the driving power level supplied to said electric drive means for actuating said actuator means.

2. An electric driving device according to claim 1, wherein said control means comprises timer means for limiting the backlash elimination operation to a predetermined time period.

3. An electric driving device according to claim 2, wherein said control means comprises means for supplying power for driving said actuator means, after said timer means measures the expiration of the predetermined time period.

4. An electric driving device according to claim 2, further comprising a measurement means for measuring a driving amount of said actuator means, said measurement means being operated after said timer means measures the expiration of said predetermined time.

5. An electric driving device according to claim 1 further comprising measurement means for measuring a driving amount of said electric drive means, said control means changing the electric power from said first power level to said second power level in response to said measurement means measuring a predetermined driving amount.

6. An electric driving device according to claim 5, wherein said measurement means comprises means for detecting an actual driving amount of said electric drive means.

7. An electric driving device according to claim 5, wherein said control means comprises timer means for terminating the electric power supply to said electric drive means for eliminating the backlash after expiration of a predetermined time even when said measurement means is not able to measure the predetermined driving amount.

8. An electric driving device according to claim 1, wherein said actuator means comprises an optical system.

9. An electric driving device according to claim 1, wherein said actuator means comprises a camera lens.

10. An electric driving device according to claim 2, wherein said actuator means comprises a driving portion for a camera.

11. A driving device capable of backlash elimination, comprising:
   (a) drive means for generating a driving force;
   (b) actuator means to be actuated by the driving force of said drive means;
   (c) transmitting means for transmitting the driving force of said drive means to said actuator means; and
   (d) control means for supplying power to said drive means to eliminate backlash of said transmitting means by operation of said drive means, the power being supplied at a first power level during an initial period of the starting operation of said drive means and a second power level lower than the first power level after said initial period, both the first and second power levels being lower than a power level which is supplied to said drive means when said drive means drives said actuator means.

12. A drive device according to claim 11, further comprising measurement means for measuring a driving amount of said drive means, said control means changing the power from the first power level to the second power level in response to said measurement means measuring a predetermined driving amount.

13. A driving device according to claim 12, wherein said measurement means comprises means for detecting an actual driving amount of said drive means.

14. A driving device according to claim 12, wherein said control means comprises timer means for terminating the supply of power to said drive means for eliminating the backlash after expiration of a predetermined time even when said measurement means is not able to measure the predetermined driving amount.

15. A driving device according to claim 11, wherein said actuator means comprises a camera lens.

16. A driving device according to claim 11, wherein said actuator means comprises a driving portion for a camera.

* * * * *

UNITED STATES PATENT AND TRADEMARK OFFICE
CERTIFICATE OF CORRECTION

PATENT NO. : 5,008,605
DATED : April 16, 1991
INVENTOR(S) : Tsunemasa Ohara, et al.

It is certified that error appears in the above-identified patent and that said Letters Patent is hereby corrected as shown below:

In the drawing

SHEET 1 [Figure 1

"PROGRAMABLE" should read --PROGRAMMABLE--.

COLUMN 1:

Line 29, "movement &" should read --movement--.

Line 52, "emliminating" should read --eliminating--.

Line 56, "is" should be deleted.

COLUMN 3:

Line 22, "The" (first occurrence) should read --the--.

Line 66, "operation" should read --operation--.

UNITED STATES PATENT AND TRADEMARK OFFICE
CERTIFICATE OF CORRECTION

PATENT NO. : 5,008,605
DATED : April 16, 1991
INVENTOR(S) : Tsunemasa Ohara, et al.

It is certified that error appears in the above-identified patent and that said Letters Patent is hereby corrected as shown below:

<u>COLUMN 5</u>:

Line 55, "release" should read --to release--.

<u>COLUMN 6</u>:

Line 13, "activated" should read --actuated--.

Signed and Sealed this

Eighth Day of December, 1998

Attest:

BRUCE LEHMAN

*Attesting Officer*      *Commissioner of Patents and Trademarks*